UNITED STATES PATENT OFFICE.

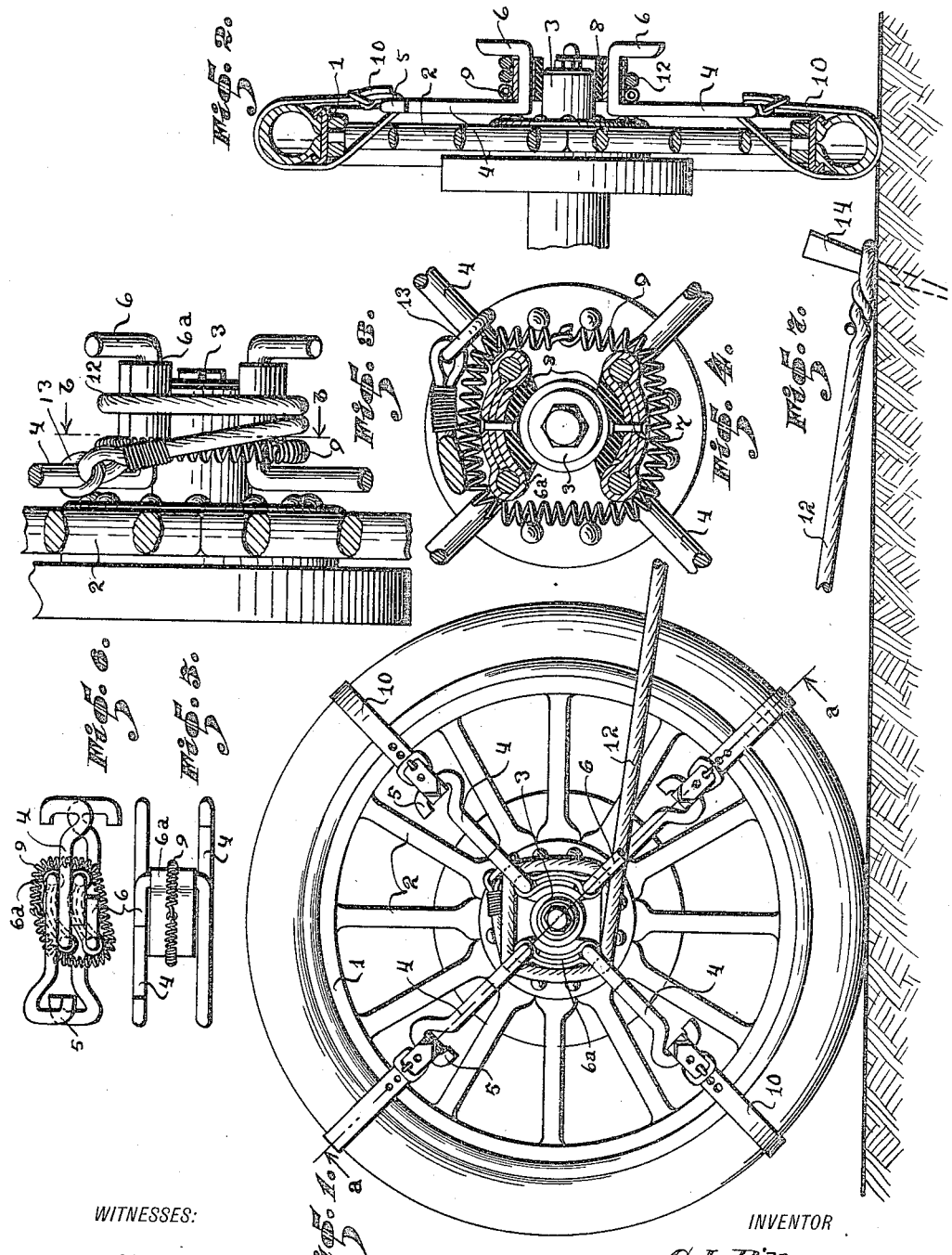

CARL L. PITTMAN, OF DE LEON, TEXAS.

WINCH ATTACHMENT FOR AUTOMOBILES.

1,151,819.  Specification of Letters Patent.  Patented Aug. 31, 1915.

Application filed July 17, 1914. Serial No. 851,520.

*To all whom it may concern:*

Be it known that I, CARL L. PITTMAN, a citizen of the United States, residing at De Leon, in the county of Comanche and State of Texas, have invented certain new and useful Improvements in Winch Attachments for Automobiles, of which the following is a specification.

My invention relates to a new and useful winch attachment for automobiles, and its object is to provide a simple form of composite winch that may be quickly mounted upon one or both of the rear wheels of an automobile, for the purpose of pulling the vehicle out of a mud hole or ditch, this result being achieved by fixing one end of a cable at some point in front or at the rear of the vehicle and allowing the other end to be wound upon the winch when rotation is communicated to the axle by starting the automobile engine.

A still further object of the invention is to provide a device of the character described that will be strong, durable, simple and efficient and comparatively inexpensive to produce, also one in which the several parts will not be likely to get out of working order.

With the above and other objects in view, the invention has relation to certain novel features of the construction and operation, an example of which is described in the following specification and illustrated in the accompanying drawing, wherein:

Figure 1 is a view showing in side elevation a rear wheel of an automobile, with which my improved winch is shown correlated in its operative position. Fig. 2 is a transverse sectional view of the same, the section being taken on *a—a* of Fig. 1. Fig. 3 is a detail view of the hub portion of the wheel, showing those parts of my mechanism which are associated with the hub. Fig. 4 is a detail vertical sectional view of the same, the section being taken on *b—b* of Fig. 3. Figs. 5 and 6 are detail views showing the parts comprising my attachment in a folded position which adapts them to be packed in an ordinary tool box. Fig. 7 is a detail view showing a preferred method of anchoring the end of the cable which is employed to draw the car out of a mud hole or ditch.

Referring now more particularly to the drawing, wherein like reference characters designate similar parts in all the figures, the numerals 1, 2 and 3 respectively designate the rim, spokes and hub of the rear wheel of an automobile, with which wheel my attachment is shown correlated. In applying my attachment, four arms 4 are mounted equidistantly and in a radial relation to the hub as is seen in Fig. 1, the outer extremities of said arms being hooked as indicated at 5, and their inner ends being formed with outwardly projecting hooks 6 preferably rectangular as is shown in Fig. 2. The arms 4 are arranged to form two pairs, the inner ends of the arms forming each pair being linked together by a three-fold strip of metal $6^a$, loosely engaging the hooks 6 as is clearly shown in Fig. 4. To the outer hook 5 of each arm 4, there is secured a strap 10 looped about the rim and tire of the wheel, the ends of said strap being buckled together. The members $6^a$ are designed to occupy positions at opposite sides of the hub 3, and to each of said members there is riveted as indicated at 7 a pad 8 of rubber or other yielding material which will be interposed between the member $6^a$ and the hub.

To initially hold the two members $6^a$ in their proper relation to the hub, a coiled spring 9 is employed, the ends thereof being hooked together as is shown in Fig. 4, the spring then being engaged with the members $6^a$ pressing the same oppositely against the hub 3. A cable 12 having one of its ends permanently engaged with a ring 13 which has been slipped over one of the arms 4 is now given one or two turns about the drum formed by the member $6^a$ in conjunction with the hooks 6. The automobile engine is now started communicating rotation to the rear axle, and a considerable force is thus exerted upon the cable 12 tending to wind the same upon said drum. Since the other extremity of the cable is fixed either through attachment to a suitable stake as indicated at 14 in Fig. 7 or in some other convenient manner, the car must necessarily move toward the fixed end of the cable as its other end is wound upon my winch. Preferably this device will be used in duplicate so that an equal pull will be exerted at each end of the rear axle tending to shift the car out of the ditch or mud hole in which it has lodged.

An important feature of my invention consists in its adaptability to be folded so as to occupy a small area, readily fitting in the ordinary automobile tool chest. The positions assumed by the parts of my device when folded are clearly shown in Figs. 5 and 6.

The invention is presented as including all such modifications and changes as properly come within the scope of the following claims:

What I claim is:

1. In a device of the character described, the combination with an automobile wheel, of a plurality of arms equidistantly mounted in a radial position upon the wheel, their outer ends being separably secured to the rim, and their inner ends being formed with hooks projecting adjacent to the hub, rigid members establishing a swinging connection between the ends of the adjacent pairs of arms, a spring acting upon said members, holding the same contiguous with the hub, and a cable having one of its extremities attached to one of said arms, and adapted to wind upon the winch comprised by the hooked inner ends of the arms in conjunction with the members connecting the same, the other end of the cable being stationary.

2. In a device of the character described, the combination with an automobile wheel, of a plurality of arms radially carried by said wheel, their outer ends being separably secured to the rim of the wheel, and their inner ends being formed with hooks projecting adjacent to the hub of the wheel, a member rigidly connecting the inner ends of each adjacent pair of arms, a spring bearing upon said members holding the same contiguous with the hub, and a cable attached to one of said arms adapted to be wound upon the winch comprised by said members in conjunction with the hooks which they connect, the other extremity of the cable being stationary.

3. In a device of the character described, the combination with an automobile wheel, of a plurality of pairs of arms mounted radially upon the wheel, the extremities of said arms being hooked, and the hooks upon their inner extremities being made to project adjacent to the hub, a strap looped about the rim of the wheel engaging the hook formed upon the outer end of each arm, a rigid member contiguous with the hub connecting the hooks formed upon each pair of arms, a spring acting upon said members maintaining the same contiguous with the hub, and a cable having one of its extremities attached to one of said arms and adapted to wind upon the winch comprised by the rigid members connecting the arms, the other extremity of said cable being fixed.

In testimony whereof I have signed my name to this specification in the presence of two subscribing witnesses.

CARL L. PITTMAN.

Witnesses:
R. P. CARTER,
D. W. BURGER.

Copies of this patent may be obtained for five cents each, by addressing the "Commissioner of Patents. Washington, D. C."